United States Patent
Gradoussoff (10) Patent No.: US 12,517,495 B2
(45) Date of Patent: Jan. 6, 2026

(54) SYSTEM AND METHOD FOR CONTROLLING OPERATING MODES OF A SYSTEM

(71) Applicant: Commissariat à l'énergie atomique et aux énergies alternatives, Paris (FR)

(72) Inventor: Baptiste Gradoussoff, Gif sur Yvette (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 244 days.

(21) Appl. No.: 18/259,481

(22) PCT Filed: Dec. 27, 2021

(86) PCT No.: PCT/EP2021/087682
§ 371 (c)(1),
(2) Date: Jun. 27, 2023

(87) PCT Pub. No.: WO2022/144337
PCT Pub. Date: Jul. 7, 2022

(65) Prior Publication Data
US 2024/0061401 A1    Feb. 22, 2024

(30) Foreign Application Priority Data
Dec. 28, 2020 (FR) ..................................... 2014185

(51) Int. Cl.
*B25J 9/16* (2006.01)
*G05B 19/4155* (2006.01)
(52) U.S. Cl.
CPC ........ *G05B 19/4155* (2013.01); *B25J 9/1656* (2013.01); *G05B 2219/50391* (2013.01)
(58) Field of Classification Search
CPC ...... G05B 19/4155; G05B 2219/50391; G05B 2219/23289; G05B 2219/39001;
(Continued)

(56) References Cited

U.S. PATENT DOCUMENTS 6,327,508 B1    12/2001 Mergard
2003/0005175 A1    1/2003 Brocco et al.
(Continued)

FOREIGN PATENT DOCUMENTS

EP    1 398 698 A1    3/2004
EP    1 532 496        5/2005
(Continued)

OTHER PUBLICATIONS

French Preliminary Search Report issued Sep. 3, 2021 in French Application 20 14185 filed on Dec. 28, 2020, 3 pages (with English Translation of Categories of Cited Documents).
(Continued)

*Primary Examiner* — Dylan M Katz
(74) *Attorney, Agent, or Firm* — Oblon, McClelland, Maier & Neustadt, L.L.P.

(57) ABSTRACT

A system and method for controlling operating modes of a system, each operating mode being implemented by an execution of one or more software components. This control system includes software components called elementary components, each elementary component having at least one input able to receive input data and/or at least one output able to transmit output data; and at least one software meta-component including one or more internal wiring diagrams, each internal wiring diagram defining interconnections between inputs and outputs of elementary components and/or meta-components, a transition logic between states defining a current state of said system and a sequence between states at least some of the states corresponding to an implementation of an internal wiring diagram, a mechanism for controlling the internal configurations, and a programming interface providing services/functions implementing at least one internal wiring scheme.

13 Claims, 8 Drawing Sheets

(58) Field of Classification Search
CPC ......... G05B 2219/40424; G05B 19/045; B25J 9/1656; B25J 9/1661
See application file for complete search history.

(56) References Cited

U.S. PATENT DOCUMENTS

2011/0125321 A1* 5/2011 Finkemeyer ........... B25J 9/1602
901/50
2023/0182292 A1* 6/2023 Namiki ................ B25J 9/1658
700/245

FOREIGN PATENT DOCUMENTS

EP        1 532 496 B1   7/2010
WO    WO 2004/021181 A2   3/2004

OTHER PUBLICATIONS

International Search Report issued May 3, 2022 in PCT/EP2021/087682 filed on Dec. 27, 2021, 7 pages.

* cited by examiner

SYSTEM AND METHOD FOR CONTROLLING OPERATING MODES OF A SYSTEM

FIELD

The present invention relates to a system and method for controlling operating modes of a system.

The invention is in the field of controlling physical systems having multiple operating modes, for example robotic systems.

BACKGROUND

In the field of robotic systems, it is known to provide software applications to allow the implementation of different control laws for one or more robots. In general, several operating modes of the robots are available, and a user has the possibility to control the robots according to these operating modes, via the provided software application. In many use scenarios, the robots must be controlled in real time, and therefore any software application for controlling and commanding a robotic system must allow the management of the changes from one operating mode to another in real time.

It is known to represent and code the operating modes via a scheme of execution sequences of software components, connected via conditional flip-flops allowing the implementation of several operating modes. However, the software applications thus obtained are complex, because of the interdependencies between the software components, and are therefore difficult to code and maintain when new operating modes are added for example. Moreover, the more the number of operating modes increases, the more the switching from one operating mode to another risks generating side effects, that is, unforeseen behaviors, due notably to the complexity of the execution scheme and the important number of switchings to be performed.

In the field of robotic systems control, various middleware have been developed dedicated to facilitate the development of software applications for the control/command of robotic systems. A middleware defines a system for structuring and exchanging information between software components allowing to realize so called "business" control applications. In the field of robotic systems, can be mentioned the middleware ROS (acronym of "Robot Operating System"), OROCOS (acronym of "Open Robot Control Software") and RT-MAPS®, this last one being more particularly dedicated to vehicle control. Most of these middleware are component-oriented, the components being executable "business" software bricks, each component having associated inputs and outputs. The components are interconnectable, according to the principles specific to each of these middleware. Nevertheless, none of these middleware packages provides the possibility of easy and real-time switching between operating modes.

The purpose of the invention is to remedy the disadvantages of the state of the art, by providing a system for controlling the operating modes of a system, compatible with real-time execution.

SUMMARY

To this end, the invention proposes, according to one aspect, a system for controlling operating modes of a system, of a system to be controlled, each operating mode being implemented by an execution of one or more software components. This control system includes:
    software components called elementary components, each elementary component having at least one input able to receive input data and/or at least one output able to transmit output data,
    at least one software meta-component including:
        one or more internal wiring diagrams, each internal wiring diagram defining interconnections between inputs and outputs of elementary components and/or meta-components,
        a transition logic between states defining a current state of said system to be controlled and a sequence between states, at least some of the states corresponding to an implementation of an internal wiring diagram, and a mechanism for controlling the internal configurations,
        a programming interface providing services/functions implementing at least one internal wiring diagram,
    a main programming interface, providing services/functions accessible via a user interface to command said system according to a plurality of operating modes, said main programming interface being connected to the programming interfaces of each software component, said main programming interface being configured to execute services/functions via the internal configuration control mechanism of each software component.

Advantageously, the invention allows an operating mode command of a system, which uses a hierarchical and recursive nesting of software components.

The system for controlling the operating modes of a system according to the invention may also present one or more of the following features, taken independently or in any technically conceivable combination.

This operating mode control system also includes a transition sequencing module allowing to switch from one operating mode to another in real time.

The sequencing module implements, following a command to switch from a current operating mode to a new operating mode, a storage of the transitions to be carried out sequentially in order to switch to said new operating mode, and a command to carry out reconfigurations of the internal wiring diagrams of the cascaded software components, before the expiry of a predetermined time cycle duration.

The storage of the transitions to be performed is a storage in a first-in, first-out storage structure, and the command of the execution of the reconfigurations implements an unstacking of the transitions stored in said storage structure.

The transition logic between states is implemented as a finite state machine.

The transition logic between states is implemented as an automaton having a finite number of hierarchical states.

This control system is able to command the operating modes of a robotic system.

According to another aspect, the invention relates to a method for controlling the operating modes of a system to be controlled, implemented by an operating mode control system as briefly described above. This method comprises the steps of:
    receiving a request to control said system to be controlled, according to an operating mode,
    calling a function or a service implemented by a meta-component provider, in order to carry out said command request
    a request to execute transition(s) between a current state and a state to be reached to execute said function or said service, by implementing the transition logic of said provider meta-component and the components nested in the provider meta-component command of reconfiguration of internal wiring diagrams according to said transitions.

The method for controlling operating modes of a system according to the invention may also present one or more of the features below, taken independently or in any technically feasible combination.

The control method further includes a storage of the transitions to be performed sequentially to pass from a current operating mode to the new operating mode required by said system command request, and a command to execute the reconfigurations of the software components in cascade, before the elapse of a predetermined time cycle duration.

The storage of the transitions to be performed is a storage in a first-in, first-out storage structure, and the command of the execution of the reconfigurations implements an unstacking of the transitions stored in said storage structure.

According to another aspect, the invention relates to a computer program composed of software instructions which, when executed by a programmable electronic device, implement a method of controlling a system according to several operating modes such as briefly described above;

BRIEF DESCRIPTION OF THE DRAWINGS

Further features and advantages of the invention will become apparent from the description given below, by way of indication and not in any way limiting, with reference to the appended figures, of which.

DETAILED DESCRIPTION

The invention will be described hereinafter more particularly in its application in a robotic system, for controlling various modes of operation of robotic equipment.

However, the invention is not limited to this type of application and finds applications more generally in any physical or computer system, applying control laws to command various operating modes of physical equipment, for example computers, connected objects, home automation equipment.

Figure 1:
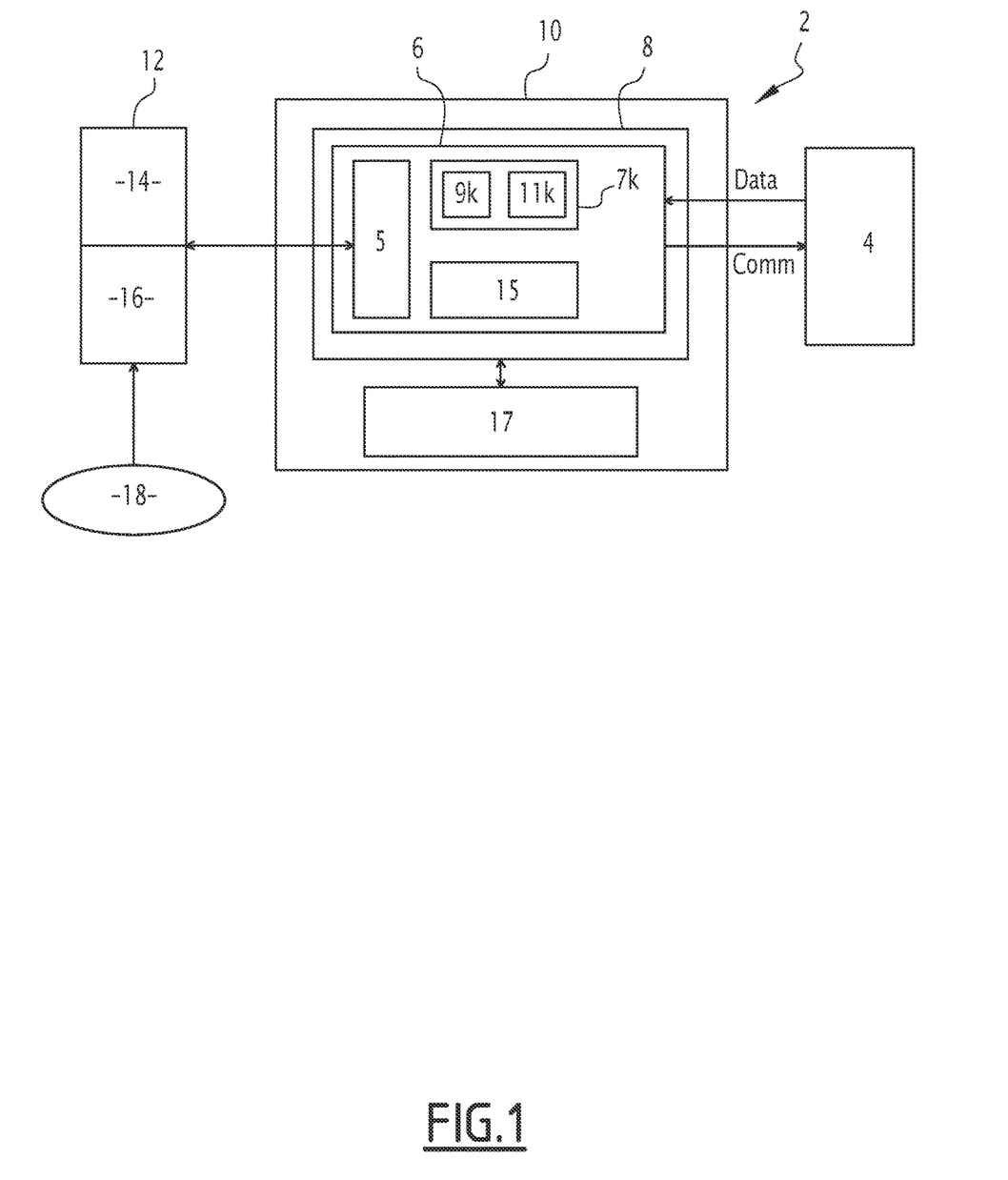
FIG. 1 schematically represents a robotic system in which the invention is applied.

FIG. 1 schematically illustrates a robotic control system 2 for controlling one or more robotic equipment 4.

For example, the robotic equipment 4 is a manipulator arm, controllable by means of control commands sent by a control software 6, or in other words a computer control program 6. This control software 6 is for example implemented by a computer processor 8 of a programmable computing device 10, for example a computer. The programmable computing device 10 further includes an electronic memory unit 17, able to store data, and connected to the computer processor 8 via a communication bus.

The control software 6 is configured to send control commands Comm to the robotic equipment 4, and to receive data, Data from the controlled equipment, for example data relating to the status of the robotic equipment 4.

It is understood that the example presented here is simplified for the purpose of explanation.

In addition, the robotic system 2 includes a user interface 12, which is able to communicate with the computer processor 8 via a data communication bus or any other suitable communication means.

In particular, the user interface 12 includes a display interface 14 and a user command input interface 16. In one embodiment, the display interface 14 is a touch screen that also incorporates the user command input interface 16.

Thus, in a use scenario, a user 18 has the ability to control the robotic equipment 4 by use of the user command input interface 16.

Alternatively, the commands to the robotic equipment are provided by a user system and not by a user.

Typically, multiple control laws allowing to control multiple modes of operation of a robotic equipment 4 are defined.

For example, in the case of a manipulator arm, the control laws comprise the Cartesian, articular, position, velocity and force control. More generally, for a simple robotic system, 5 to 10 operating modes are generally distinguished.

For an efficient robotic control system, real-time operation is desirable. The control software 6 must efficiently manage any switch from one operating mode to another following a user command.

In order to achieve these objectives, the control software 6 implements an operating mode management method for controlling a system such as described in more detail below.

The control software 6 includes:

a main programming interface 5, which provides executable functions/services, which can be called up via the user interface 12;

nested meta-components and 7 k software components, described in more detail below, each meta-component or component providing a 9 k programming interface, which provides functions/services executable by the meta-component, and an internal 11 k control mechanism configuration, which implements, for each meta-component, transition logic between states and internal wiring diagrams, as described in more detail below;

a transition sequencing module 15 that allows switching from one operating mode to another in real time.

Figure 2:
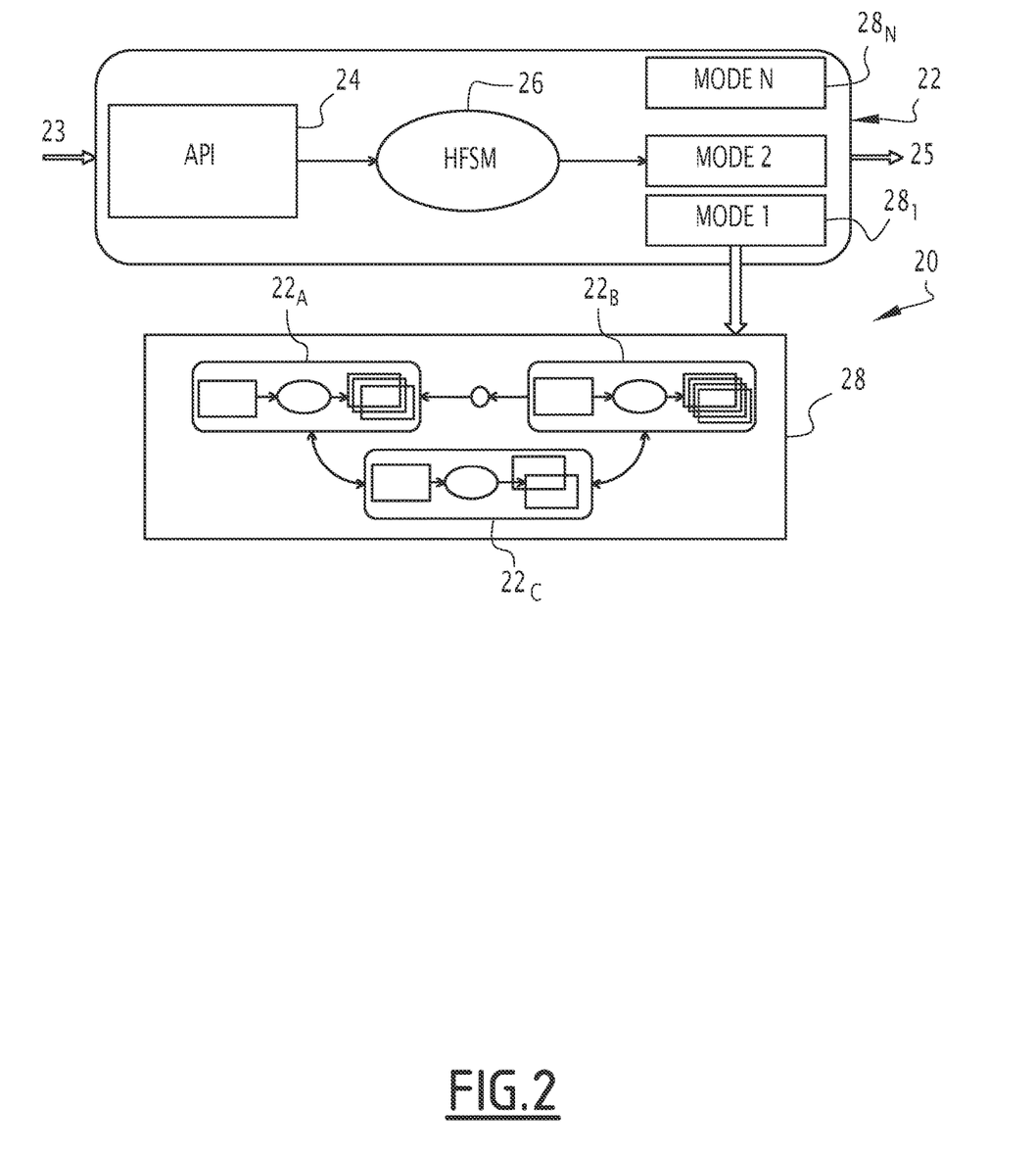
FIG. 2 schematically represents a meta-component and an associated wiring diagram according to one embodiment.

FIG. 2 schematically represents a meta-component and an associated wiring diagram according to one embodiment, implemented in a control system 20 for controlling the operating modes of a system according to one embodiment.

This system 20 is a component-oriented system, built, based on nested software components, forming a hierarchical nesting, as described in more detail below.

In the following, a software component that does not encapsulate another software component will be referred to as an elementary component, and a meta-component will be referred to as a software component that encapsulates one or more components that are elementary software components and/or meta-components.

The term "component" will hereafter refer to both an elementary component and a meta-component.

A meta-component 22 comprises a PLC programming interface 24, which allows access to the functions or services provided by the meta-component 22 and manages the inputs 23 and outputs 25 associated with the meta-component.

The programming interface 24 relies on a transition logic 26 between system states, some states being associated with the wiring diagrams, defining internal operating modes of the meta-component.

In one embodiment, the transition logic 26 is implemented for example in the form of an automaton, in particular in the form of an automaton with a finite number of hierarchical states or HFSM (for "Hierarchical finite state machine").

In another embodiment, in a simple case, the transition logic 26 is implemented as a variable, the value of which corresponds to an internal operating mode of the meta-component, for example a variable n, the value of n indicating a wiring diagram corresponding to an operating mode, Mode_n, to be selected.

In another embodiment, the transition logic 26 is implemented as a finite state machine FSM, or a behavior tree.

The mechanism for controlling the internal configurations of the meta-component uses the transition logic 26.

In other words, each meta-component provides a mechanism for controlling internal configurations according to the internal wiring diagrams, to reach a system state.

The invention will be more particularly described below in an embodiment in which the transition logic 26 is implemented as a PLC with a finite number of hierarchical HFSM states.

The HFSM 26 defines a current state of said system to be controlled and a hierarchical sequence between states, each state corresponding to an implementation of a number K of internal wiring diagrams, typically K=0 or K=1, and, in certain cases, K>1. The rules of association between states and internal wiring diagrams are specified and stored.

A meta-component 22 comprises N internal wiring diagrams $28_1$ to $28_N$, with N a positive integer, for example N=4 in the example of FIG. 2.

The transition logic 26 defines M states, conditions for transitions or sequences between states, and signals triggering the transitions.

In one embodiment, the transition logic is public, that is, visible to user software objects of the meta-component.

The internal wiring diagrams $28_1$ to $28_4$ are defined in the meta-component 22 and are preferably private, that is, not accessible to a user.

Each internal wiring diagram 28 defines interconnections between components and/or meta-components, with input/output data flows and execution sequences of functions/services provided by the interconnected components/meta-components.

A wiring diagram 28 is illustrated schematically in FIG. 2. In this example, the wiring diagram 28 implements three meta-components $22_A$, $22_B$, $22_C$, each meta-component having a number $N_A$, $N_B$, $N_C$ of internal wiring diagrams. The interconnections between the meta-components $22_A$, $22_B$, $22_C$ are realized using predefined interconnection relationships specific to each wiring diagram.

Thus, it is clear that the proposed system allows a nested structuring of components of a control software of a physical equipment control system, in particular of a robotic system.

A meta-component 22 thus generated comprises so-called "child" components or meta-components accessible via the programming interfaces provided by each of the components and meta-components, which allows a hierarchical and recursive nesting.

A system control software includes a main meta-component, the highest level of hierarchy, which includes first meta-components and/or child components of the first level of descendant, the first meta-components of the first level of descendant, in turn comprising second meta-components and/or first level of descendant second meta-components, which are meta-components or components of the second level of descendant relative to the main meta-component, and so on. In such a hierarchical structure, parent/child type of relationships link components and meta-components of different levels.

Figure 3:
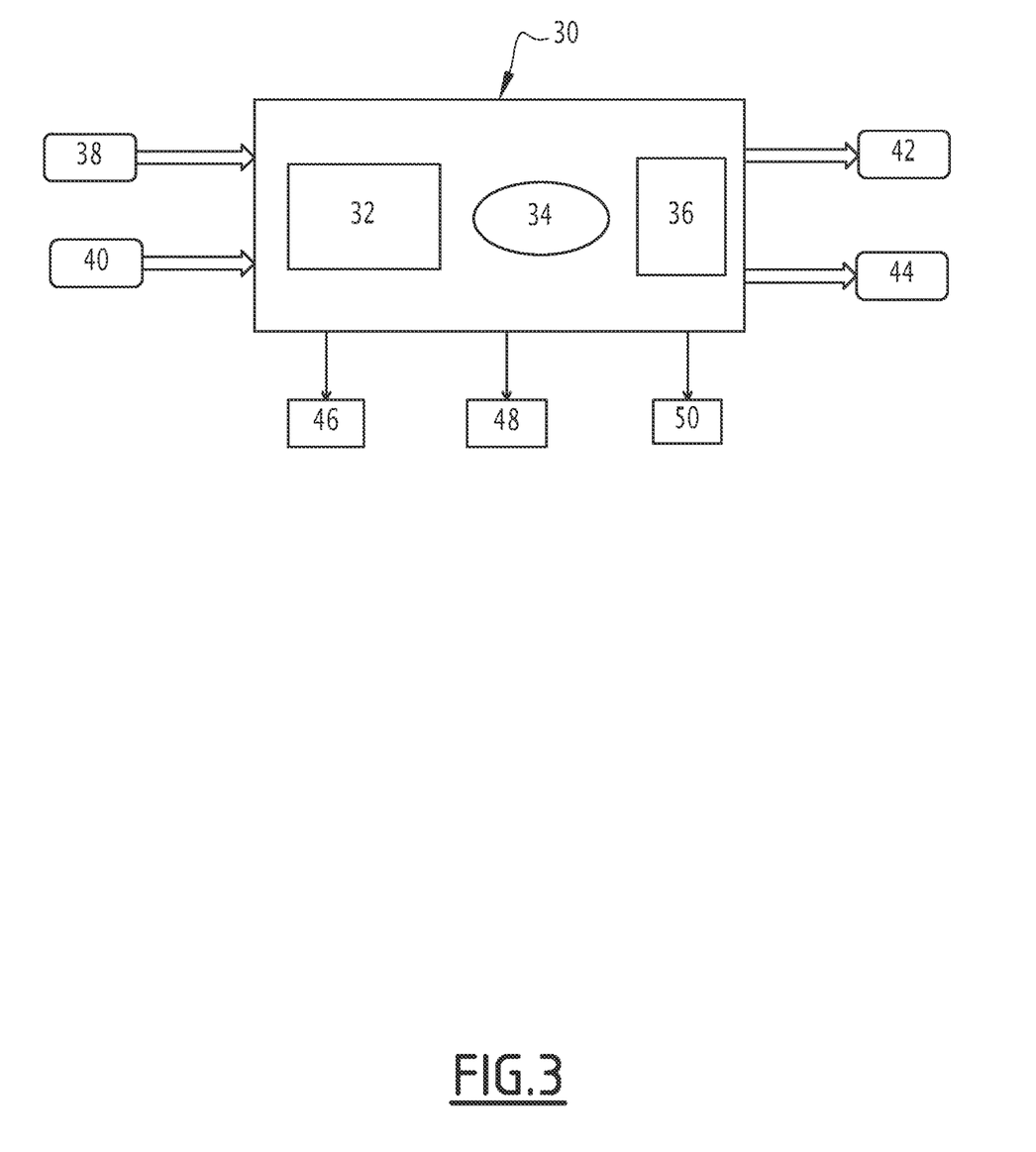
FIG. 3 schematically illustrates an elementary component.

FIG. 3 illustrates schematically an elementary component 30.

An elementary component is a software component that implements software code, known as "business" software code, contributing to the realization of one or more functionalities in relation to the control laws of the hardware equipment to be controlled. For example, in the case of a robotic arm, the business software code comprises functions for generating a trajectory, serving in a Cartesian coordinate system, etc.

The elementary component 30 includes a module 36 comprising the "business" software code, and optionally a programming interface 32 that relies on a transition logic 34 between states.

For an elementary component, the transition logic 34 provides a current state of the elementary component to one or more parent or user meta-components via the programming interface.

Furthermore, in case the elementary component implements for example several variants of a function, the transition logic between states allows structuring and reconfiguring the implementation variant, for example, selection of the calculation variant, transmission of the associated parameters.

The elementary component also includes the inputs comprising the input data 38 and services 40 provided by a third (parent or brother) component (meta or elementary). It also includes outputs comprising the output data 42 and the services 44 provided to a third party component. The number and nature of the input data 38, 40 and output data 42, 44 are variable, they are so-called "business" data depending on the physical equipment control system to be controlled.

A meta-component includes inputs and outputs similar to those described above for an elementary component.

In addition, an elementary component can optionally generate events 46, an event being a transmitted message. Similarly, a meta-component can also optionally generate events.

A mechanism for subscribing to messages is also provided, a parent meta-component having the ability to subscribe to an event emitted by a child component, for example in order to execute a function in response to that event. This mechanism is known as "call-back".

In addition, a component (meta or elementary) has variables of type "parameter" 48 and "measurement" 50, available via its API. The parameters 48 are variables accessible in writing. The measurements are read-only variables.

In simple cases, it is possible to use a parameter as a replacement for an HFSM, in order to control the internal configurations of a meta-component. The change of value of the parameter, via a dedicated "callback" function, then allows to trigger a reconfiguration of the internal operating mode.

It is understood from this description that an elementary component differs from a meta-component by the fact that an elementary component does not include another nested component, but that their architecture and their inputs/outputs are similar. An elementary component includes a business code implementation module.

Hereafter, the term component will be used for both meta-component and elementary component.

To facilitate the explanation, we consider the example of a software for controlling a robotic arm dedicated to master-slave teleoperation.

Figure 4:
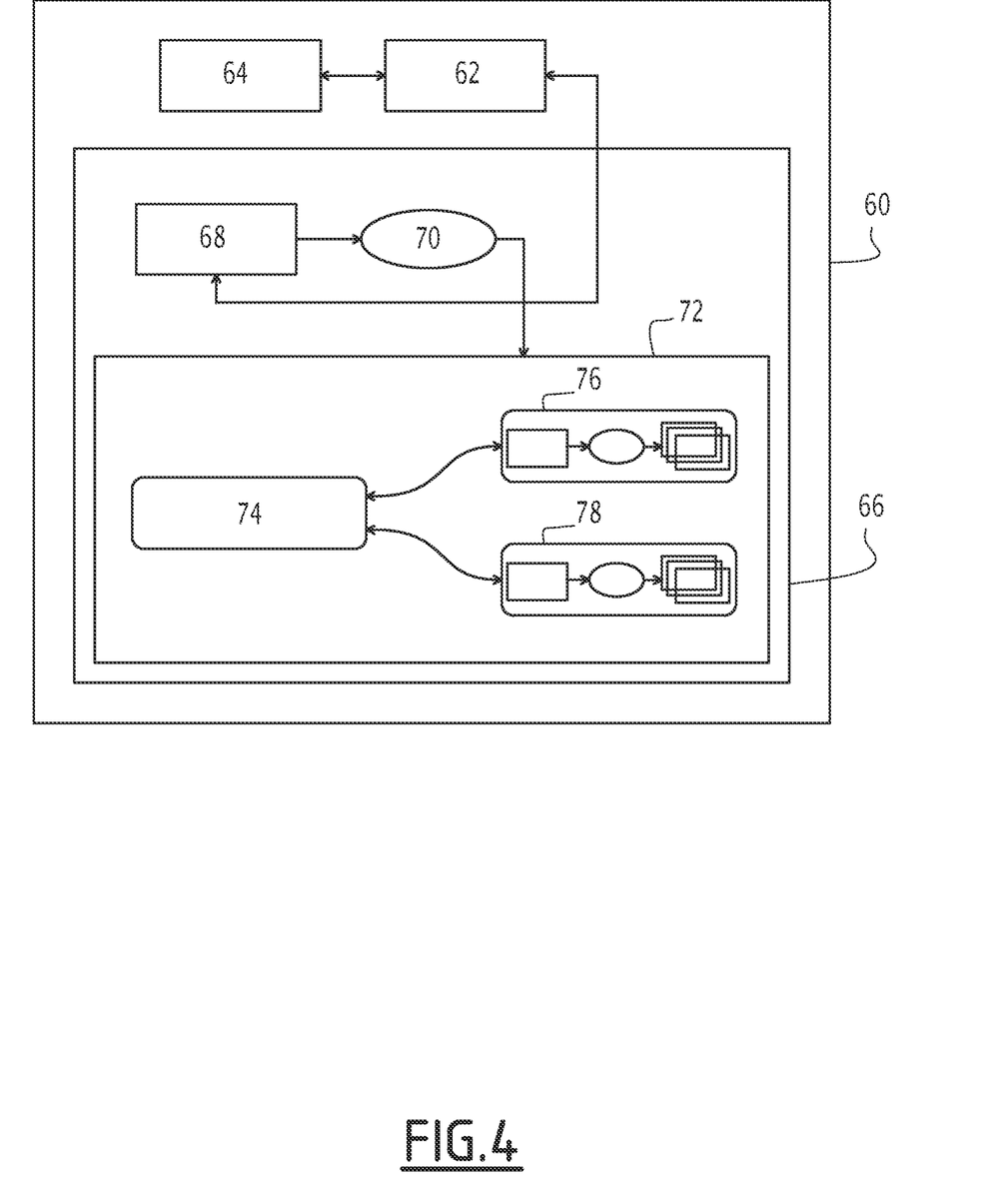
FIG. 4 is a synopsis of the functional blocks of a robotic system in one example application.

In this application, as schematically illustrated in FIG. 4, the control software 60 comprises a main programming interface 62, and a transition sequencing module 64 allowing real time switching from one operating mode to another.

The control software 60 further includes a master-slave teleoperation meta-component 66, comprising a programming interface 68, a module 70 implementing a transition logic between states, this module 70 controlling the reconfiguration of internal operating modes.

The meta-component 66 further includes an internal wiring diagram 72, which controls the teleoperation, which comprises a master/slave coupling management component 74, a so-called "master arm" operation management meta-component 76 and a so-called "slave arm" operation management meta-component 78.

The master programming interface 62 is connected to the programming interface 68 of the meta-component 66, as well as the programming interfaces of the respective meta-components 76 and 78.

The details of meta-components 76 and 78 are not described here, as these meta-components are structurally similar to the meta-component described with reference to FIG. 2.

Figure 5:
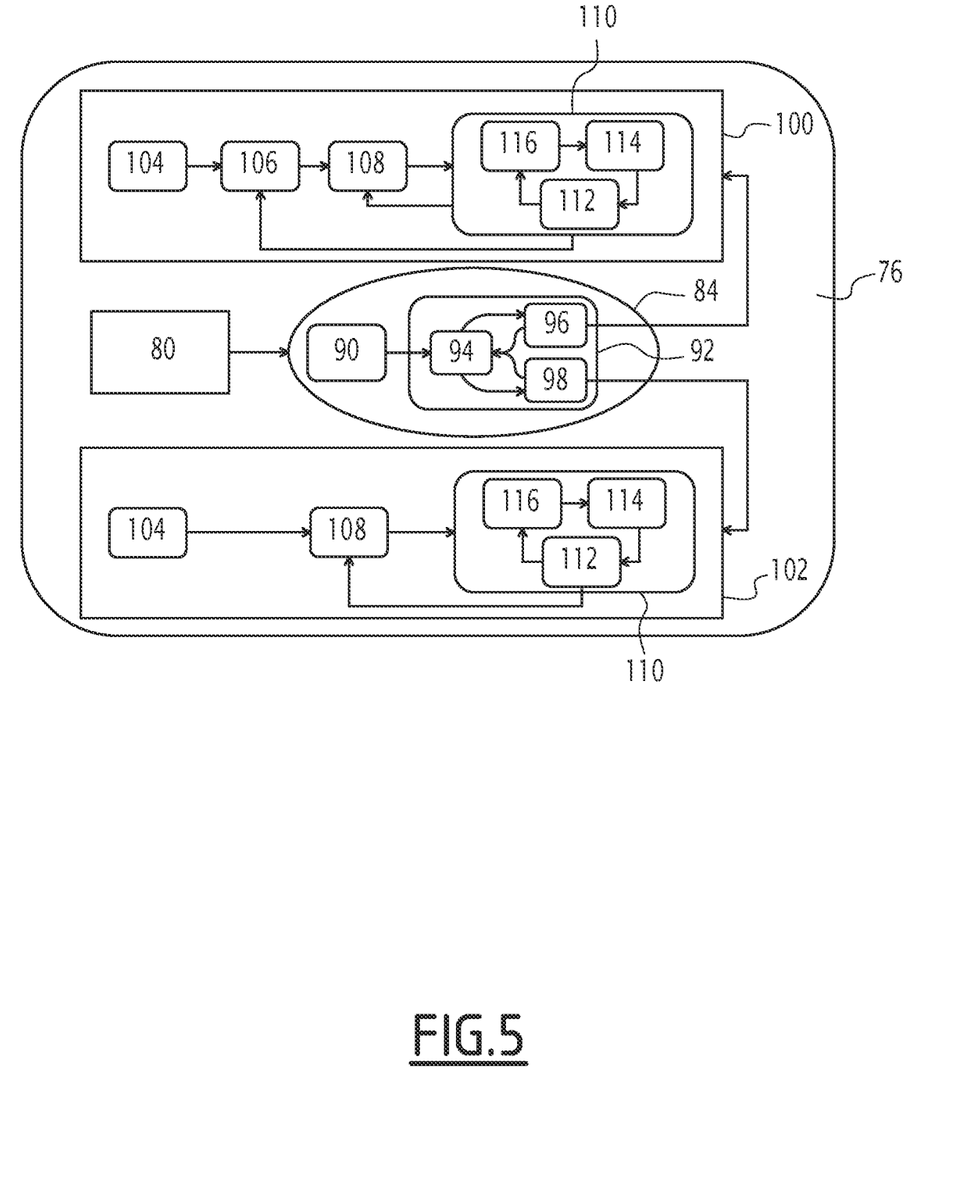
FIG. 5 schematically illustrates an example of transition logic between states and associated wiring diagrams.
Figure 6:
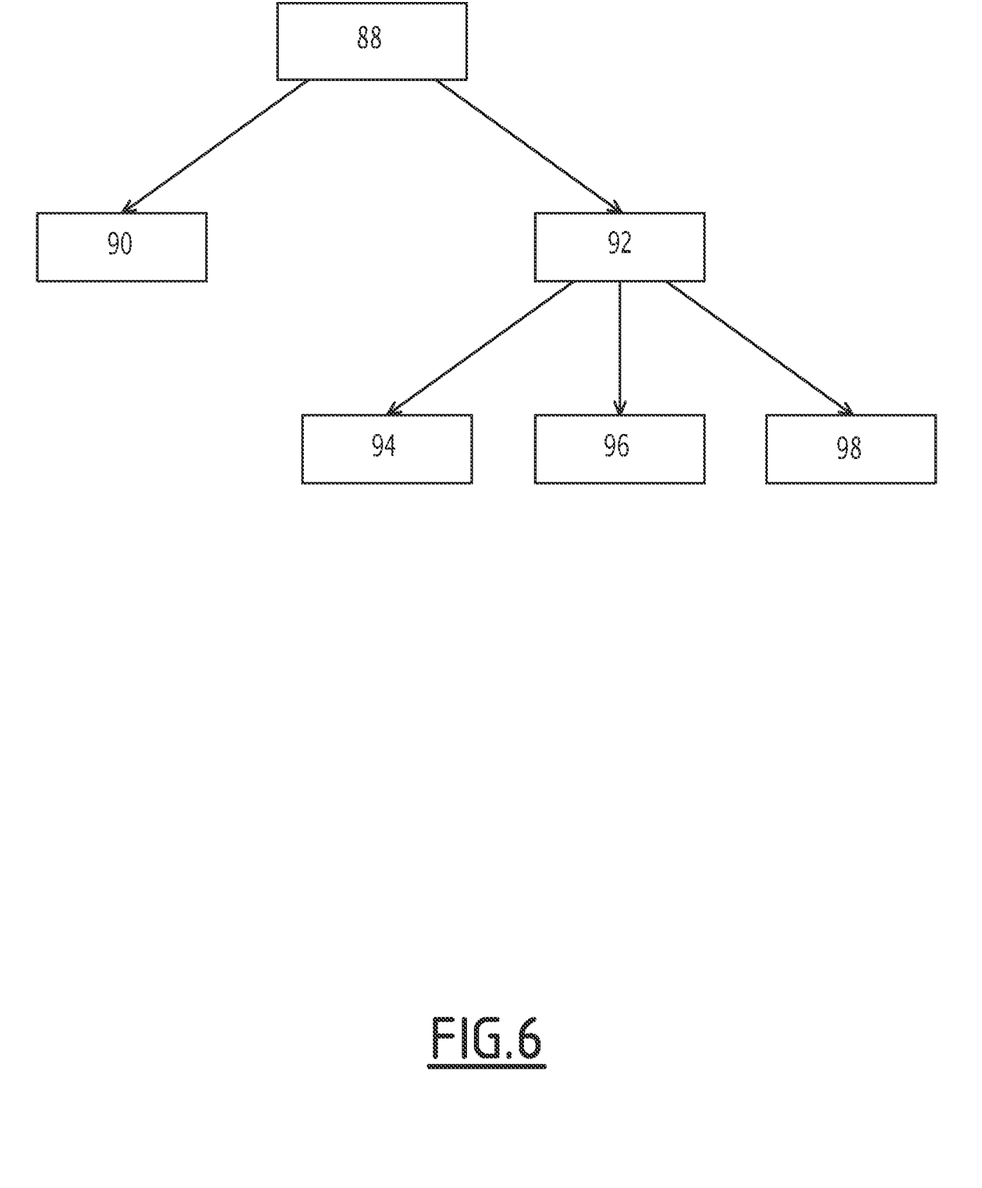
FIG. 6 is a schematic representation of a hierarchical transition logic.

FIG. 5 illustrates a more detailed example of an embodiment of an operation management meta-component "master arm" 76, implementing a transition logic 84 between states implemented as an HFSM automaton. FIG. 6 schematically illustrates the state hierarchy in this example application.

In this embodiment, the transition logic 84 comprises a root state 88, the states 90 and 92 directly descending from the root state and corresponding respectively to a "power off" state 90 and a "power on" state 92.

The "power on" state 92 comprises 3 states of lower hierarchical level, which are respectively:

State 94: resting state;
State 96: Cartesian movement command;
State 98: joint movement command.

The start-up of the system to be controlled uses the following state transitions: root state 88, then power off state 90, then power on state 92, then resting state 94.

In the nominal operating mode, the system is controlled in the Cartesian movement mode (state 96), in the joint operating mode (state 98), or in the resting state (state 94).

The state 96 of the Cartesian movement command corresponds to a wiring diagram 100, and the state 98 of the joint movement command corresponds to a wiring diagram 102.

Each wiring diagram 100, 102 includes components and meta-components, which perform the calculations, provide the services and transmit actual movement commands to the robotic arm.

In this example, the respective wiring diagrams 100, 102 involve the following elementary components:

trajectory generation component 104, configurable to generate a Cartesian or joint trajectory, that is, which generates the Cartesian trajectory to be followed by the end of the robot in space, or the joint trajectory to be followed by each joint of the robot, from one or more destination points provided by the user;

component 106 for conversion from Cartesian space to joint space, also called IGM module for inverse geometric model;

component 108 for joint correction, allowing the calculation of torque set points for each joint of the robot, from the robot joint position set point and its real position.

The respective wiring diagrams 100, 102 involve a low-level robot control meta-component 110, which manages a set of low-level commands, for example, the interfacing 114 with the hardware, the monitoring of setpoints, the control-command of the motor torques 116 . . . . In addition, the meta-component 110 implements a geometric model of the robot 112, which allows converting motor velocity and position measurements into joint and Cartesian measurements.

For the control in joint mode, the wiring diagram 102 is used, the trajectory generation 104 is configured to provide joint position setpoints, which are sent to the component 108 that provides as output a joint setpoint torque to the low-level robot control meta-component 110.

For the Cartesian mode control, the wiring diagram 100 is used, the trajectory generation 104 provides Cartesian position setpoints, which are converted to joint positions by the component 106, and then sent to the component 108 which provides as output a joint setpoint torque to the low-level robot control meta-component 110.

Each wiring diagram defines a combination of components and connections that are specific to the implementation of the controlled mode of operation, while using elementary components in a mutualized manner.

Preferably, the transition between two different modes of operation, for example between the Cartesian mode of operation and the joint mode of operation is accomplished by switching from the Cartesian movement command state 96 to the resting state 94 and then to the joint movement command state 98.

A change in operating mode command results in changes in the component states, and the change in configuration of one component may impact the operation of another component running downstream.

In order to ensure that the execution flows of the nested components are consistent and respected, a command method for operation modes as described below is implemented.

Figure 7:
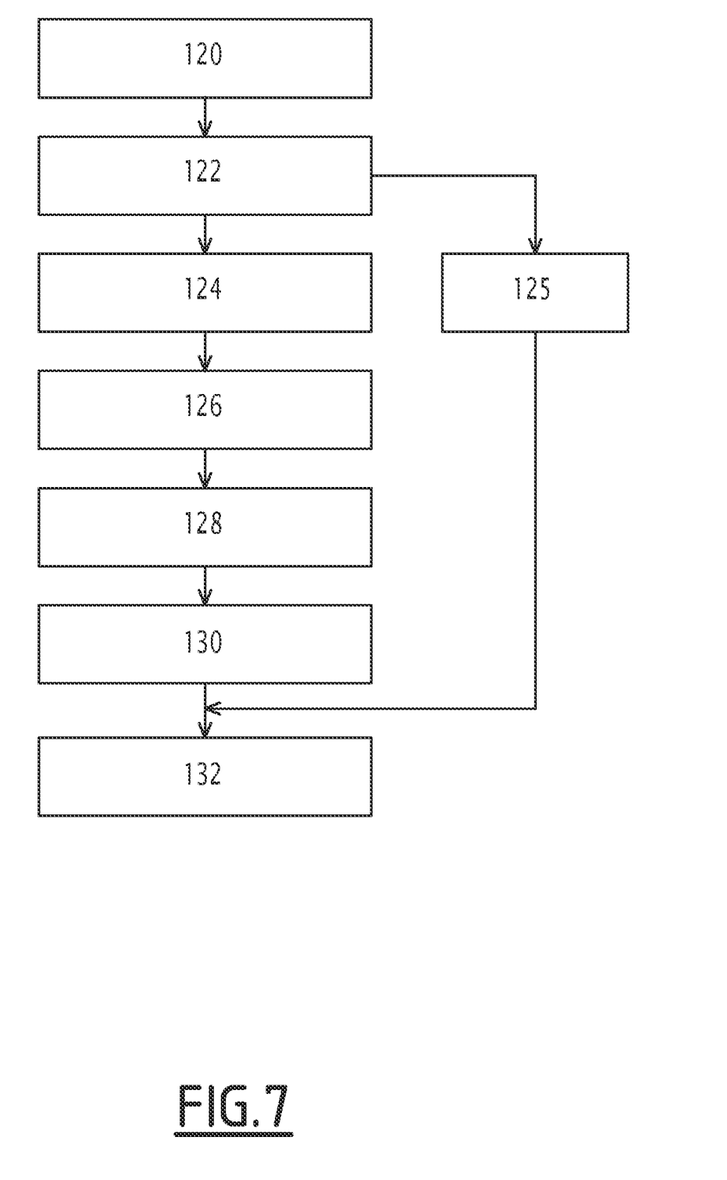
FIG. 7 is a flowchart of the main steps of a process for controlling the operating modes of a robotic system according to one embodiment.

FIG. 7 is a flowchart of the main steps of a command method for operation modes of a system in one embodiment of the invention. This command method is implemented by a computer program, executed by one or more processors of an electronic computing device.

The method includes a first step 120 of receiving a request to control the system, from a user interface.

For example, in the case of the robotic system described as an example above, the control request is a Cartesian movement command in the example described above, while the robotic system is in a joint movement command state.

The method then includes a step 122 of calling a function provided by a meta-component, hereinafter referred to as the provider meta-component, to carry out the user request. Execution of the function is put on hold (step 125) during the implementation of steps 124-130 described below.

Preferably, steps 124 to 130 are implemented by a different thread, as explained below with reference to FIG. 8.

The method includes a step 124 of requesting the execution of transition(s) between a current state and a state to be reached to obtain the internal operating mode allowing the execution of the function corresponding to the user request.

Step 124 implements the internal configuration control mechanism, that is, the transition logic and associated wiring diagrams. By using the meta-component nesting system via the wiring diagrams, the requests for similar transition(s) at the level of child components of the provider meta-component.

The transitions between states to be performed are stored, in a storage structure allowing sequential scheduling, for example in a queue, and more generally a storage structure of the first-in-first-out (FIFO) type, managed by the sequencing module in order to carry out a change of operating mode in real time without side effects. The storage (step 126) is carried out until the end of the time cycle of duration RT, RT being for example between 1 and 10 ms.

Then, the method includes a step 128 of unstacking the stored state transitions, according to the "first in, first out" or FIFO processing order, this step being carried out after the execution of the cyclic calculations of the set of elementary commands in progress related to the current state of the system.

It should be noted that the execution of the state transitions can trigger new requests for cascading transitions, these new requests being put in the queue.

The execution of previously stored state transitions is controlled, and requests to change or reconfigure wiring diagrams are stored, for example in a dictionary-like storage structure.

The rewiring of the wiring diagrams is performed in step 130, at substantially the same time.

When the system is in the configuration to be reached, corresponding to the operating mode required in the user request, the provider meta-component executes (step 132) the function or service corresponding to the user request.

Figure 8:
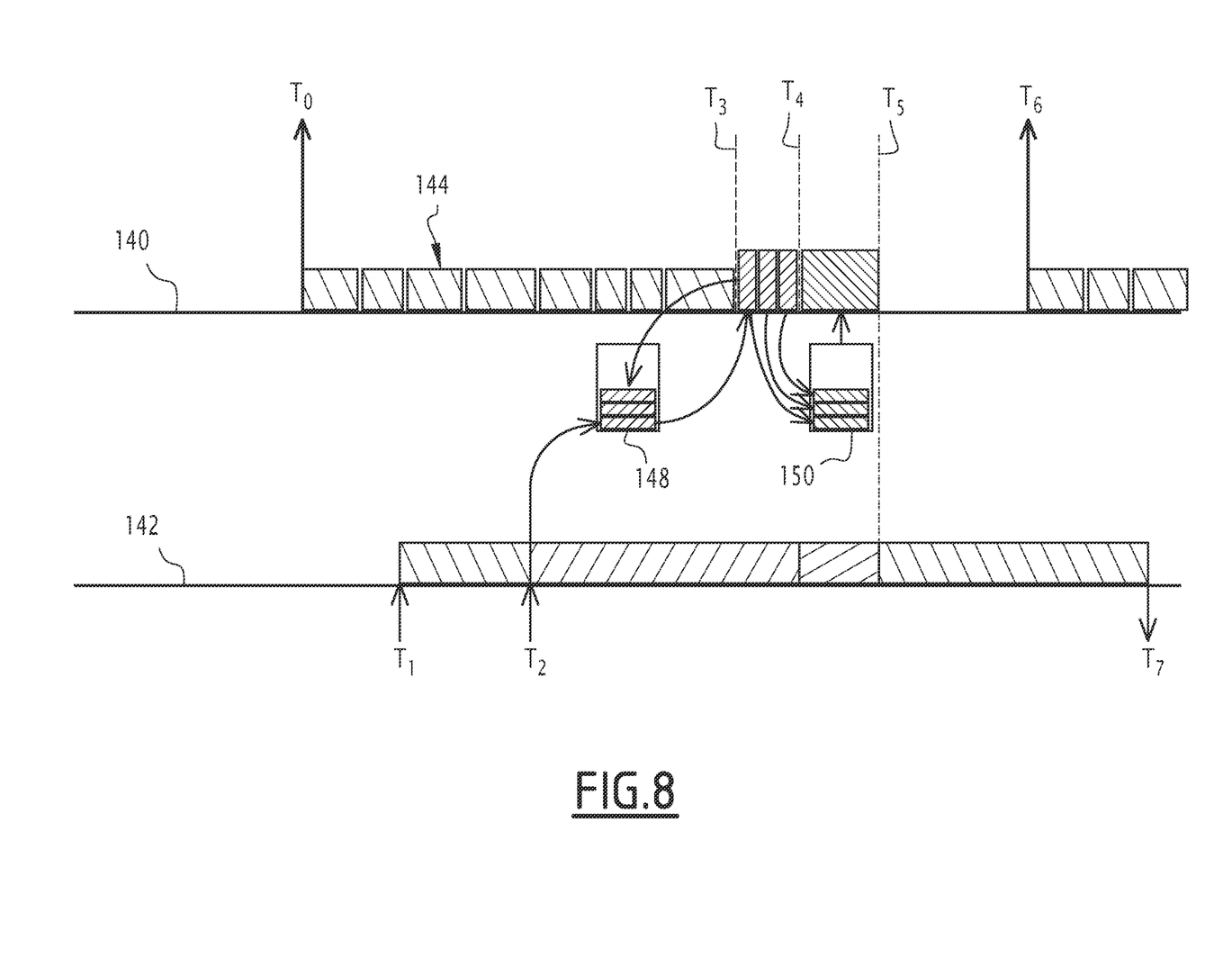
FIG. 8 illustrates the sequencing and synchronization logic of a method such as described above with reference to FIG. 7.

FIG. 8 schematically illustrates the sequencing and synchronization logic of a method such as described above with reference to FIG. 7. In particular, the schematic illustration shows that the method implements two execution threads 140 and 142. The thread 140 manages the real time execution (Real-time thread), the thread 142 of execution of the system command request provided by the user ("API thread") which is carried out in asynchronous mode.

The real-time execution thread 140 carries out operations synchronously relative to time cycles of duration RT, marked at clock times $T_0$, $T_6$ such that the duration between the two time instants $T_0$ and $T_6$ is equal to RT.

The execution thread 140 executes elementary commands 144 corresponding to a current state of the system to be controlled, that is, to a current operating mode, up to an end-of-execution instant $T_3$.

The execution thread 142 is executed in parallel. At a time instant $T_1$, which is later than $T_0$, a system control request is received from the user interface, which corresponds to the execution of step 122. The execution thread 142 is then put on hold, at time $T_2$. The time $T_2$ corresponds to one or more state transition requests on one or more components of the system.

These state transition requests are queued in a first-in, first-out storage structure 148. The queue in the storage structure 148 comprises the transitions to be executed to achieve the state of the system to be controlled for the mode of operation required by the user.

The queue is unstacked, in FIFO order, by the execution thread 140, between the time instants $T_3$ and $T_4$. The wiring diagrams to be executed in accordance with the queued transitions 148 are stored, for example, in a dictionary of wiring diagrams to be applied 150. The execution of the wiring diagram reconfigurations (step 130) is carried out between the time instants $T_4$ and $T_5$. At time instant $T_5$ the execution of the execution thread 142 is resumed, and this until any time instant $T_7$, which is later than time instant $T_6$ in this example implementation.

The method described above with reference to FIGS. 7 and 8 ensures that the control of the internal configurations, that is, the transitions between states and reconfiguration of internal wiring diagrams, is carried out in a consistent and synchronized manner, while the user commands are received and processed in an asynchronous mode.

Thus, when the system to be controlled is already in operation according to a current operating mode, the switchover to another operating mode commanded by the user is carried out by taking into account the sequences of transitions indicated by the transition logic of each meta-component, and this in a nested manner.

The invention claimed is:

1. A control system for controlling a plurality of operating modes of a robotic system to be controlled, each operating mode being implemented by an execution of one or more software components, the control system being configured to control real-time switching from one operating mode of the robotic system to another operating mode of the robotic system, the control system comprising:
   elementary components, each elementary component having an input configured to receive input data and/or an output configured to emit output data,
   at least one software meta-component including
      at least one internal wiring diagram, each internal wiring diagram, of the at least one internal wiring diagram, defining interconnections between the inputs and the outputs of the elementary components and/or meta-components,
      a transition logic between states defining a current state of the robotic system and a sequence between states, at least some of the states corresponding to an implementation of a given internal wiring diagram specific to a given operating mode of the robotic system, and processing circuitry configured to control the internal configurations,
      a programming interface providing services/functions implementing the at least one internal wiring diagram, relying on the transition logic between the system states, some of the states being associated with the given internal wiring diagram,
   a main programming interface, providing services/functions accessible via a user interface for controlling said robotic system in real time according to the plurality of operating modes, said main programming interface being connected to the programming interfaces of each software component, said main programming interface being configured to execute the services/functions via the processing circuitry configured to control the internal configurations of each software component.

2. The control system according to claim 1, wherein the processing circuitry is further configured to perform a switchover from one operating mode of the robotic system to another operating mode of the robotic system in real time.

3. The control system according to claim 2, wherein the processing circuitry is further configured to implement, following a command to switch from a current operating mode of the robotic system to a new operating mode of the robotic system, a storage of transitions to be performed sequentially to switch to said new operating mode, and a command to perform reconfigurations of the internal wiring diagrams of cascaded software components, before an elapse of a predetermined time cycle duration.

4. The control system according to claim 3, wherein the storage of the transitions to be performed is a storage in a first-in, first-out storage structure, and wherein the command to perform the reconfigurations implements unstacking the transitions stored in said storage structure.

5. The control system according to claim 1, wherein said transition logic between states is implemented as a finite state machine.

6. The control system according to claim 5, wherein said transition logic between states is implemented as an automaton having a finite number of hierarchical states.

7. A method for controlling the operating modes of the robotic system to be controlled, implemented by the control system according to claim 1, the method comprising:
- receiving a control request from said robotic system to be controlled, according to an operating mode of the plurality of operating modes,
- calling a function or a service implemented by a provider meta-component, in order to perform said received control request,
- requesting an execution of transition(s) between a current state and a state to be reached to execute the function or the service, by implementing the transition logic of said provider meta-component and of components nested in the provider meta-component, and
- controlling a reconfiguration of the at least one internal wiring diagrams based on said transitions.

8. The control method according to claim 7, further comprising storing transitions to be performed sequentially to change from a current mode of operation to a new mode of operation required by said system control request, and controlling an execution of reconfigurations of software components in cascade, prior to an elapse of a predetermined time cycle duration.

9. The control method according to claim 8, wherein the storing of the transitions to be performed comprises storing in a first-in, first-out storage structure, and
- wherein the controlling of the execution of the reconfigurations implements an unstacking of the transitions stored in said storage structure.

10. A non-transitory computer-readable medium storing a computer program including software instructions which, when executed by a programmable electronic device, implement the method of controlling the operating modes of the robotic system to be controlled according to claim 7.

11. The control system according to claim 1, wherein the operating modes of the robotic system include Cartesian control, articular control, position control, velocity control, and force control.

12. The control system according to claim 1, comprising at least two software meta-components, each software meta-component including at least one child elementary component and/or at least one child meta-component, and wherein the transition logic between states is a hierarchical transition logic between states.

13. The control system according to claim 3, wherein the processing circuitry is further configured to store the transitions to be performed sequentially according to a hierarchical nesting between the meta-components.

* * * * *